(12) United States Patent
Nagano et al.

(10) Patent No.: US 12,100,986 B2
(45) Date of Patent: Sep. 24, 2024

(54) CHARGING SYSTEM

(71) Applicant: PRIME PLANET ENERGY & SOLUTIONS, INC., Tokyo (JP)

(72) Inventors: Kodai Nagano, Nagoya (JP); Atsushi Sugihara, Toyota (JP); Shizuka Masuoka, Nagoya (JP); Sokichi Okubo, Okazaki (JP); Hiroyuki Obata, Nishinomiya (JP); Hiroshi Temmyo, Kakogawa (JP); Yuki Yoshikawa, Akashi (JP); Jun Nishikawa, Himeji (JP); Wataru Okada, Kobe (JP); Iwao Nitta, Kobe (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 460 days.

(21) Appl. No.: 17/379,116

(22) Filed: Jul. 19, 2021

(65) Prior Publication Data

US 2022/0045536 A1 Feb. 10, 2022

(30) Foreign Application Priority Data

Aug. 6, 2020 (JP) .................................. 2020-133484

(51) Int. Cl.
*H02J 7/00* (2006.01)
*H02J 7/02* (2016.01)
(Continued)

(52) U.S. Cl.
CPC ...... *H02J 7/00714* (2020.01); *H02J 7/00034* (2020.01); *H02J 7/02* (2013.01);
(Continued)

(58) Field of Classification Search
CPC ...... H02J 7/00034; H02J 7/00714; H02J 7/02; H02J 50/10; H02J 50/80
See application file for complete search history.

(56) References Cited

U.S. PATENT DOCUMENTS

| | | | |
|---|---|---|---|
| 11,709,532 B2 * | 7/2023 | Maeng | G06Q 50/06 713/340 |
| 2009/0058370 A1 | 3/2009 | Odaohhara | |

(Continued)

FOREIGN PATENT DOCUMENTS

| | | |
|---|---|---|
| CN | 101685981 A | 3/2010 |
| CN | 107370196 A | 11/2017 |

(Continued)

*Primary Examiner* — Richard Isla
*Assistant Examiner* — Sadia Kousar
(74) *Attorney, Agent, or Firm* — Finnegan, Henderson, Farabow, Garrett and Dunner, LLP

(57) ABSTRACT

A charging system includes a power transfer device and a rapid charging battery. The power transfer device includes a first power transfer unit being compatible with a first charging standard specifying that the rapid charging battery is to be charged at a predetermined current value. The rapid charging battery includes a first charging unit being compatible with the first charging standard, and a second power transfer unit being compatible with a second charging standard specifying that power is to be transferred at a predetermined current value that is lower than the predetermined current value specified by the first charging standard.

19 Claims, 1 Drawing Sheet

(51) Int. Cl.
  *H02J 50/12* (2016.01)
  *H02J 50/80* (2016.01)
  *H04M 1/02* (2006.01)

(52) U.S. Cl.
  CPC ............. *H02J 50/12* (2016.02); *H02J 50/80* (2016.02); *H04M 1/0202* (2013.01)

(56) References Cited

U.S. PATENT DOCUMENTS

| | | | |
|---|---|---|---|
| 2015/0045091 A1 | 2/2015 | Nakatani | |
| 2015/0326046 A1* | 11/2015 | Song | H02J 7/00 320/165 |
| 2016/0043585 A1* | 2/2016 | Zawadzki | H02J 7/0068 320/137 |
| 2019/0305597 A1* | 10/2019 | Venkatraman | H02J 7/24 |

FOREIGN PATENT DOCUMENTS

| | | |
|---|---|---|
| CN | 207677454 U | 7/2018 |
| CN | 109087179 A | 12/2018 |
| CN | 110011371 A | 7/2019 |
| JP | 2009-060718 A | 3/2009 |
| JP | 2013-034290 A | 2/2013 |
| JP | 2014-036510 A | 2/2014 |
| JP | 2014-120816 A | 6/2014 |
| JP | 2015-049851 A | 3/2015 |
| KR | 2014-0135899 A | 11/2014 |
| KR | 2017-0097275 A | 8/2017 |
| KR | 101783659 B1 | 10/2017 |
| KR | 2017-0123074 A | 11/2017 |

* cited by examiner

CHARGING SYSTEM

CROSS REFERENCE TO RELATED APPLICATIONS

The present application claims priority from Japanese Patent Application No. 2020-133484 filed on Aug. 6, 2020, which is incorporated by reference herein in its entirety.

The present disclosure relates to a charging system.

BACKGROUND

JP 2014-120816 A discloses an invention that relates to a wireless communication device. The wireless communication device includes a non-contact charging unit and a wireless communication unit. The non-contact charging unit transmits power through a coil to an opposite device in a non-contact condition. The wireless communication unit includes a plurality of antennas. The plurality of antennas are disposed at substantially equal intervals from the center of the central axis of the coil. When the non-contact charging unit transmits power to the opposite device, the wireless communication unit transmits data by wireless communication from each of the antennas. According to the publication, the function of non-contact charging and the function of high-speed wireless communication are integrated in the just-described configuration. The publication describes that such a configuration makes it possible to simultaneously process the positioning for non-contact charging and the positioning for high-speed wireless communication and to achieve high-speed wireless communication with the opposite device without additionally necessitating highly precise positioning with the opposite device.

SUMMARY

Mobile terminals such as smartphones have such functions as the Internet connections and payment functions. For this reason, mobile terminals have become increasingly indispensable in human society. However, a mobile terminal loses the functions once the battery runs out. Once the battery runs out, it takes as long as about 15 minutes to 30 minutes to charge a certain amount of power that is necessary for a certain time, for example, to charge to 25% SOC. Portable chargers, which are easily carried, are also used for charging a mobile terminal. Nevertheless, portable chargers are also unable to avoid the problem of running out of the battery. On the other hand, it is possible to find facilities that provide an AC power outlet for charging the mobile terminals, such as restaurants, in town. Once the battery runs out, it takes as long as about 15 minutes to 30 minutes to charge a certain amount of power that is necessary for a certain time, for example, to charge to 25% SOC. This means that the mobile terminal needs to be kept connected to the AC power outlet, and during that time, the user needs to wait for completion of charging of the mobile terminal. Accordingly, there is a need for quickly obtaining electric power in town to charge a mobile terminal to a level at which the mobile terminal can be used continuously for a certain time. Nevertheless, no system that can accommodate such a need has yet been established.

A charging system according to the present disclosure includes a power transfer device and a rapid charging battery. The power transfer device includes a first power transfer unit being compatible with a first charging standard specifying that the rapid charging battery is to be charged at a predetermined current value. The rapid charging battery includes a first charging unit that being compatible with the first charging standard, and a second power transfer unit being compatible with a second charging standard specifying that power is to be transferred at a predetermined current value that is lower than the predetermined current value specified by the first charging standard. The just-described charging system enables the user to obtain a required electric power within a short time by the rapid charging battery using rapid charging from the power transfer device. The power transfer from the rapid charging battery is specified so that power is to be transferred at a current value that is compatible with the second charging standard and lower than the predetermined current value specified by the first charging standard. As a result, both obtaining of the required electric power in a short time and prolonging of the battery life are achieved.

The current value specified by the first charging standard may be higher than or equal to 5 C rate of the rapid charging battery. The first charging unit may pre-store a predetermined current value corresponding to the charging performance of the rapid charging battery. The current value at which the rapid charging battery is charged from the power transfer device may be determined based on the current value that is stored in the first charging unit.

It is also possible that the charging system may be configured to communicate usage information between the power transfer device and the rapid charging battery when the rapid charging battery is charged from the power transfer device. It is also possible that the charging system may be configured to execute billing to a user of the rapid charging battery based on the usage information.

In an embodiment described above, the charging system may further include a server for providing a charging service to users. The server may include a memory storage unit, a communication unit, and a controller. The memory storage unit may store at least one of user information for identifying a user who is eligible to receive the service and an identity information of a rapid charging battery that is eligible to receive the service. The communication unit may be communicatively connected to at least one of the power transfer device and the rapid charging battery. The controller may be configured to execute the following processes:

Process a1: A process of acquiring predetermined information that is verifiable with the user information and the identity information stored in the memory storage unit from at least one of the power transfer device and the rapid charging battery that are included in the charging system;

Process a2: A process of determining whether or not it is permissible to provide the service based on the predetermined type of information that is acquired in the process a1; and Process a3: A process of charging the rapid charging battery with the power transfer device according to the first charging standard if it is determined in the process a2 that it is permissible to provide the service.

Such a charging system is able to provide a charging service from the power transfer device to the rapid charging battery through user authentication via the server.

The charging system may further include a mobile terminal. The mobile terminal may include an internal battery that supplies electric power to the mobile terminal, and a second charging unit. The second charging unit may be electrically connected to the rapid charging battery and may be compatible with the second charging standard. In this case, the current value specified by the second charging standard may be less than 5 C rate of the rapid charging battery. The rapid charging battery may be incorporated in a protective case for the mobile terminal. The rapid charging battery may be built into the mobile terminal. In this case, the second power transfer unit and the second charging unit may be constructed of a single control unit.

In another embodiment of the present disclosure, a charging system includes a power transfer device and a mobile terminal. The power transfer device includes a first power transfer unit being compatible with a first charging standard specifying that the rapid charging battery is to be charged at a predetermined current value. The mobile terminal includes: a rapid charging battery; an internal battery supplying electric power to the mobile terminal; and a first charging unit being compatible with the first charging standard and configured to charge the rapid charging battery; and a second charging unit being compatible with a second charging standard specifying that charging is to be performed at a predetermined current value that is lower than the predetermined current value specified by the first charging standard, for charging the internal battery from the rapid charging battery. Thus, the rapid charging battery may be built into the mobile terminal. The control unit for charging the internal battery from the rapid charging battery may be constructed of a single control unit.

The charging system may be configured to execute a first charging process and a second charging process. The first charging process is a process of charging the rapid charging battery from the power transfer device at a current value specified by the first charging standard. The second charging process is a process of, subsequent to the first charging process, charging the internal battery from the rapid charging battery at a current value specified by the second charging standard.

The second charging unit may pre-store a predetermined current value corresponding to the charging performance of the internal battery. The current value at which the internal battery is charged from the rapid charging battery may be determined based on the current value that is stored in the second charging unit. It is also possible that usage information may be communicated between the power transfer device and the mobile terminal when the first charging process is executed. The charging system may execute billing to a user of the mobile terminal based on the usage information.

In an embodiment described above, the charging system may further include a server for providing a charging service to users. The server includes a memory storage unit, a communication unit, and a controller. The memory storage unit stores at least one of user information for identifying a user who is eligible to receive the service and an identity information of a mobile terminal or a rapid charging battery that is eligible to receive the service. The communication unit may be communicatively connected to at least one of the power transfer device, the rapid charging battery, and the mobile terminal. The controller may be configured to execute the following processes:

Process b1: A process of acquiring predetermined information that is verifiable with the user information and the identity information stored in the memory storage unit from at least one of the power transfer device, the rapid charging battery, and the mobile terminal that are included in the charging system.

Process b2: A process of determining whether or not it is permissible to provide the service based on the predetermined type of information that is acquired in the process b1; and Process b3: A process of charging the rapid charging battery with the power transfer device according to the first charging standard if it is determined in the process b2 that it is permissible to provide the service.

In such an embodiment, the server may be configured to communicate usage information with at least one of the power transfer device and the mobile terminal when the first charging process is executed. The server may be configured to execute a process of billing to a user of the mobile terminal based on the usage information. The server may be configured to execute a process of billing to a user of the rapid charging battery based on the usage information.

In another embodiment of the present disclosure, a rapid charging battery includes a first charging unit being compatible with a first charging standard specifying that the battery is to be charged at a predetermined current value of higher than or equal to 5 C rate, and a second power transfer unit being compatible with a second charging standard specifying that power is to be transferred at a predetermined current value that is lower than the predetermined current value specified by the first charging standard. The first charging standard is set to a current value that is higher than or equal to two times a maximum current value that is permitted by the second charging standard. The just-described rapid charging battery enables the user to obtain a required electric power within a short time by rapid charging. In contrast, the power transfer from the rapid charging battery is able to accomplish slower power transfer.

DETAILED DESCRIPTION

Figure 1:
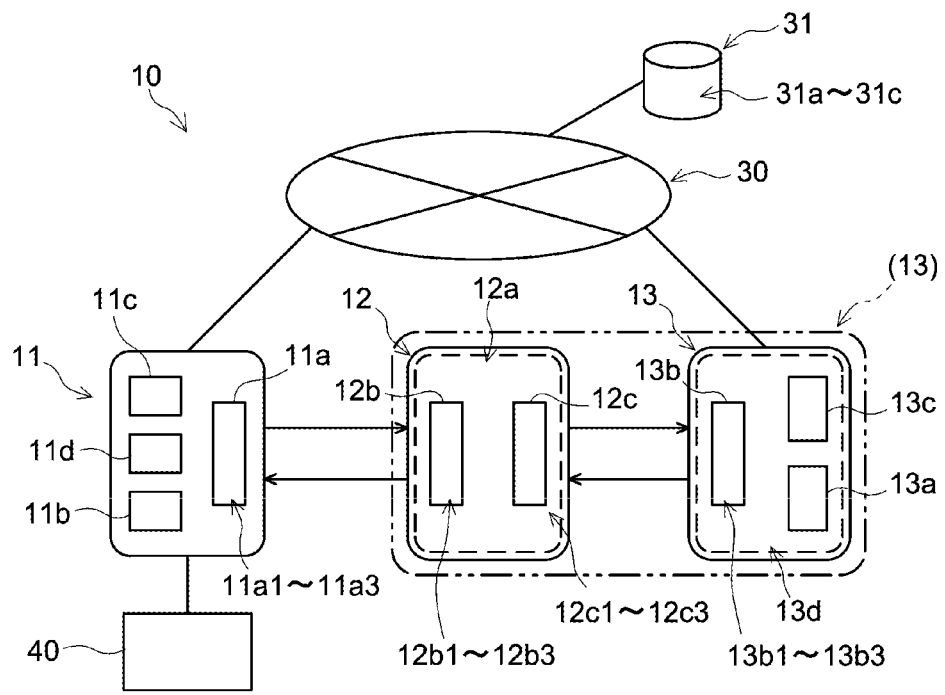
FIG. 1 is a block diagram schematically illustrating a charging system 10.

Hereinbelow, a typical embodiment of the present disclosure will be described in detail with reference to the drawings. Throughout the drawings, identical reference characters and descriptions are used to designate like elements or features. It should be noted that dimensional relationships in the drawings do not necessarily reflect actual dimensional relationships.

The present inventors intend to provide a novel system of resolving the problem of running out of the batteries of mobile terminals in town by utilizing a rapid charging battery that makes use of the technology of lithium-ion secondary batteries used as drive power supplies for hybrid electric vehicles, and a service thereof.

The batteries to be built into mobile terminals are not required to yield a high power such as required by the secondary batteries for in-vehicle applications. On the other hand, they tend to be required to drive a mobile terminal for a long time at one time of charging. For the batteries that are built into mobile terminals, higher capacity tends to be considered more important although there is a need for rapid charging. For this reason, a high capacity type design, the primary purpose of which is to increase the electric power that can be stored per unit volume and per unit weight, is adopted for the batteries that are built into mobile terminals. Although high capacity batteries are capable of storing higher electric power per unit volume and per unit weight, their performance tend to degrade more easily when charged at a high current value. It is desirable that mobile terminals be charged at a relatively lower current value so that their performance degradation can be prevented. Likewise, the portable chargers capable of charging the mobile terminals are also designed to achieve high capacity.

Typical examples of the materials used for the secondary battery (lithium-ion secondary battery) used as the portable charger and the internal battery of mobile terminals include lithium cobalt oxide for the positive electrode active material, graphite for the negative electrode active material, and a gelled electrolyte in which a polymer composed of polyethylene oxide or polyvinylidene fluoride is impregnated with an electrolyte solution for the electrolyte. Such a configuration achieves an energy density of about 200 to about 300 Wh/g. It also permits charging and discharging at a current value of about 1 C to 3 C. The secondary batteries used for the portable chargers and the internal batteries of mobile terminals tend not to permit charging and discharging at a relatively high current value, such as higher than 5 C or 10 A, because battery degradation proceeds more quickly at such a high current value. The battery capacity of the smartphones that are available in the market in recent years is said to be about 3000 mAh to 3500 mAh, for example, and it takes about 30 minutes to charge such a battery from 0% of the remaining capacity to about 50%. Thus, the current state of the art is that the batteries that are built into latest smartphones require approximately 30 minutes to be charged from 0% of the remaining capacity to about 50%. Also, the charge speed is controlled to be slower after around the time at which the capacity reaches 80%.

A battery used as the drive power source for a hybrid electric vehicle is used in combination with a system that converts and stores the regenerative energy produced during, for example, braking of the vehicle into electric power. When the regenerative energy produced during braking, for example, is converted into electric power, a high voltage is produced within a short time, which produces a high charge current for the battery. At this time, the battery is unable to recover the electric power beyond the maximum permissible charge current of the battery. On the other hand, in the hybrid electric vehicle, electric power is supplied, as needed, from an electric generator that uses the engine as the power source. For this reason, the secondary batteries used as drive power supplies for hybrid electric vehicles seek to obtain higher performance in efficient recovering of the regenerative energy converted into electric power, rather than increasing their capacity. The batteries used as drive power supplies for hybrid electric vehicles are designed to be capable of rapid charging. In order to efficiently recover the regenerative energy, the batteries used as drive power supplies for hybrid electric vehicles are designed in such a manner that the performance degradation can be minimized if a high current flows within a short time. The lithium-ion secondary batteries used as drive power supplies for hybrid electric vehicles adopt various design ideas in, for example, the structure of the active material layer, the viscosity and composition of the electrolyte solution, and addition agents to the electrolyte solution.

Typical examples of the materials used for the lithium-ion secondary batteries used as the drive power source for hybrid electric vehicles include what is called an NMC three-component lithium-containing transition metal composite oxide, which contains nickel manganese cobalt, for the positive electrode active material, graphite for the negative electrode active material, and ethylene carbonate or ethyl methyl carbonate for the electrolyte solution. For example, a large-sized prismatic battery incorporated in hybrid electric vehicles may achieve a charge-discharge current of about 120 A at 30 C while preventing the deterioration of the secondary battery. As the research advances further in the future, the technology of drive power supplies for hybrid electric vehicles is expected to evolve further to achieve charging at an even higher current value.

Charging System 10

The following describes embodiments of a charging system 10 disclosed herein. FIG. 1 is a block diagram schematically illustrating the charging system 10. As illustrated in FIG. 1, the charging system 10 includes a power transfer device 11, a rapid charging battery 12, and a mobile terminal 13. In this embodiment, the charging system 10 is data-communicatively connected to a server 31 through a network 30, such as the Internet. Each of the power transfer device 11, the rapid charging battery 12, and the mobile terminal 13 may include a control device, although not shown in the drawings.

The controller is a device for controlling various processes of the devices. The controller may be implemented by a computer that is operated according to a predetermined program. Specifically, various functions of the controller may be processed by an arithmetic unit [also referred to as a processor, CPU (central processing unit), or MPU (microprocessing unit)] and a memory storage device (such as a memory and a hard disk) of each computer that constitutes the controller. For example, the configurations of the controller may be embodied as a database that stores various data embodied by a computer, a data structure, or a processing module that performs predetermined computing processes according to a predetermined program, or as part of the database, the data structure, or the processing module. The controllers built into the respective devices may be configured to communicate data with each other and to function in cooperation with each other.

Power Transfer Device 11

The power transfer device 11 includes a first power transfer unit 11a, a power supply unit 11b, communication unit 11c, and a control unit 11d. The power transfer device 11 is connected to a network 30 and an external power supply 40.

First Power Transfer Unit 11a

The first power transfer unit 11a is compatible with a first charging standard, which specifies that the rapid charging battery 12 is to be charged at a predetermined current value. The first power transfer unit 11a may include, for example, a transmission device 11a1 that is capable of transmitting electric power, and a controller 11a2. The transmission device 11a1 may adopt a device that is capable of high power transmission. The controller 11a2 may be configured to control the electric power transmitted by the transmission device 11a1. The first power transfer unit 11a may also include a communication circuit 11a3 for communicating with the rapid charging battery 12 and the mobile terminal 13. Various types of near field communication standards may be adopted for the communication circuit.

The power supply unit 11b is a device that receives electric power from the external power supply 40 and supplies electric power through the first power transfer unit 11a to an external device such as the rapid charging battery 12 and the mobile terminal 13. The external power supply 40 may be a 100 V or 200 V AC power supply. The power supply unit 11b may include an AC/DC converter.

The communication unit 11c is a device that communicates data with an external device such as the server 31 through the network 30.

Rapid Charging Battery 12

The rapid charging battery 12 includes a battery unit 12a, a first charging unit 12b, and a second power transfer unit 12c.

Battery Unit 12a

The battery unit 12a is represented by a dashed line in FIG. 1. The battery unit 12a of the rapid charging battery 12 is designed to be capable of conducting rapid charging. For example, the battery technology for the drive power source for hybrid electric vehicles may be utilized as appropriate for the battery unit 12a. Such a battery unit 12a may be designed to be able to minimize the battery deterioration even when charged with a current value of 5 C or higher (for example, 8 C or higher, or 10 C or higher). In addition, the battery unit 12a may have a battery capacity such that the mobile terminal running out of battery can be recovered, for example, such that the battery built into the mobile terminal can be charged to about 25% SOC. More preferably, the battery unit 12a may have a further higher capacity.

The present description defines the 1 C rate as a current level at which the theoretical capacity of a battery is fully charged or discharged in 1 hour by constant-current charging or constant-current discharging. For example, when the battery has a capacity of 2 Ah, the 1 C rate is 2 A. 3 C rate means three times the current value of 1 C, which means the current value at which the theoretical capacity is fully charged or discharged in 20 minutes in the just-mentioned example. For example, when the current value specified by the first charging standard is 5 C of the rapid charging battery 12, about 15% of the theoretical capacity of the rapid charging battery 12 can be charged in about 3 minutes. About 25% of the theoretical capacity of the rapid charging battery 12 can be charged in about 5 minutes. If the battery technology of drive power supplies for hybrid electric vehicles is further applied in the future, it will be possible to accomplish charging at a further higher charge current value in an even shorter time. Therefore, it is expected that the rapid charging battery 12 will be charged to the required electric power in several seconds or several tens of seconds.

First Charging Unit 12b

The first charging unit 12b is compatible with the first charging standard. The first charging unit 12b may include a receiving device 12b1, a controller 12b2, and a communication circuit 12b3. The receiving device 12b1 may correspond to the transmission device 11a1 of the first power transfer unit 11a. The receiving device 12b1 may adopt, for example, a device that is capable of receiving electric power at high power. The controller 12b2 may be configured to control the receiving electric power. The communication circuit 12b3 may adopt a communication standard corresponding to the communication circuit 11a3 of the first power transfer unit 11a.

The power transfer device 11 and the rapid charging battery 12 are electrically connected to each other by the first power transfer unit 11a and the first charging unit 12b. The transmission unit adopted for the first power transfer unit 11a and the receiving unit adopted for the first charging unit 12b may adopt a non-contact power transfer (wireless power transfer) system. Examples of techniques of non-contact power transfer include an electromagnetic induction system, a magnetic resonant coupling system, an electric field coupling system, and a radio wave receiving system.

Herein, the current value specified by the first charging standard may be higher than or equal to 5 C rate of the rapid charging battery 12. The current value specified by the first charging standard may be set to, for example, 5 C, 8 C, 10 C, or 12 C rate of the rapid charging battery 12. It is expected that the performance of the rapid charging battery 12 will improve in the future. It is expected that, even with a non-contact type power transfer system, required electric power can be charged from the power transfer device 11 to the rapid charging battery 12 in several minutes, in several ten seconds, or even in several seconds.

The first charging unit 12b may pre-store a current value corresponding to the charging performance of the rapid charging battery 12. The current value at which the rapid charging battery 12 is charged from the power transfer device 11 may be determined based on the current value that is pre-stored in the first charging unit 12b. This makes it possible to set a current value depending on the performance of the rapid charging battery 12 when the rapid charging battery 12 is charged from the power transfer device 11. In this case, when the rapid charging battery 12 is charged from the power transfer device 11, it is possible to set an appropriate current value depending on the performance of the rapid charging battery 12 even in the case where the performance of the rapid charging battery 12 is different from one to another, for example, in the case where the model of the rapid charging battery 12 used is different depending on the user.

The present inventors prepared a rapid charging battery 12 that can achieve a maximum battery voltage of about 4.2 V and is in a portable size, by adopting the battery technology used in drive power supplies for hybrid electric vehicles. More specifically, the prototype rapid charging battery 12 used a what is called NMC three-component lithium-containing transition metal composite oxide, which contains nickel manganese cobalt, for the positive electrode active material, graphite for the negative electrode active material, and ethylene carbonate or ethyl methyl carbonate for the electrolyte solution.

The prototype rapid charging battery 12 herein achieves a maximum battery voltage of about 4.2 V and had a weight and a size such that it can be easily carried. The prototype rapid charging battery 12 further incorporated a charging unit capable of non-contact charging. The charging unit includes a power receiving coil. A power transmitting table was additionally prepared that can transfer power contactlessly and on which the prototype rapid charging battery 12 can be placed and charged. The power transmitting table incorporates a power transmitting coil at the position where the rapid charging battery 12 is to be placed. The power transmitting coil is connected to a power transfer unit corresponding to the charging unit. The rapid charging battery 12 is placed on the power transmitting coil of the power transmitting table so that its power receiving coil incorporated in its charging unit faces the power transmitting coil of the power transmitting table. Then, electric power is supplied to the power transfer unit to thereby charge the rapid charging battery 12 contactlessly. As a result, the present inventors confirmed that the rapid charging battery 12 can be charged at a current higher than 10 A. Table 1 shows the results of the test.

TABLE 1

| Battery voltage [V] | Charge current [A] | Power [W] |
| --- | --- | --- |
| 7.5 | 10.2 | 36 |
| 7.6 | 10.2 | 37 |
| 7.7 | 10.2 | 37.9 |
| 7.8 | 10.2 | 39.1 |
| 7.9 | 10.3 | 40.1 |
| 3 | 10.2 | 41.1 |
| 3.1 | 10.2 | 42.5 |
| 3.2 | 10.2 | 43.5 |
| 3.3 | 10.2 | 44.4 |
| 3.4 | 10.2 | 45.4 |
| 3.5 | 10.1 | 45.9 |
| 3.6 | 10 | 46.6 |

TABLE 1-continued

| Battery voltage [V] | Charge current [A] | Power [W] |
|---|---|---|
| 3.7 | 9.8 | 46.6 |
| 3.8 | 9.5 | 46.3 |
| 3.9 | 8.8 | 44.7 |
| 4 | 5.4 | 29.1 |
| 4.1 | 1.7 | 11.5 |
| 4.2 | 0 | 2.4 |

Table 1 shows the records of the charge current and the transmission voltage for the rapid charging battery 12 at various battery voltages. The battery voltage of the rapid charging battery 12 is in correlation with the state of charge (SOC) of the rapid charging battery 12. As shown in Table 1, in this test example, the rapid charging battery 12 was charged from a battery voltage of 2.5 V (0% SOC) to a battery voltage of 4.2 V (100% SOC). As shown in Table 1, rapid charging at a charge current of higher than 10 A was possible. Additionally, the transmission power of the power transmitting table may be adjusted according to a predetermined charging standard so that the charge current exceeds 10 A. Thus, the use of the rapid charging battery 12 that adopts the battery technology used for drive power supplies for hybrid electric vehicles makes it possible to achieve remarkably faster rapid charging than the batteries built into latest smartphones even in a size that can be easily carried. It is also possible that the first charging standard may specify that the rapid charging battery 12 is to be charged at a predetermined current value. The power transfer device 11 may include a first power transfer unit 11a that is compatible with the first charging standard. The rapid charging battery 12 may include a first charging unit 12b that is compatible with the first charging standard.

Second Power Transfer Unit 12c

The second power transfer unit 12c is compatible with the second charging standard. The second charging standard specifies that, for example, power is to be transferred at a predetermined current value that is lower than the predetermined current value specified by the first charging standard. In this embodiment, the second power transfer unit 12c may include a transmission device 12c1 that is capable of transmitting electric power, and a controller 12c2, and a communication circuit 12c3. The transmission device 12c1 may be capable of high power transmission according to the second charging standard. The controller 12c2 may be configured to control the electric power transmitted by the transmission device 12c1. Various types of near field communication standards may be adopted for the communication circuit.

In the power transfer from such a second power transfer unit 12c, the current value may be controlled to be a low current value such that, for example, the deterioration of the internal battery 13a of the mobile terminal 13 can be prevented sufficiently. Thus, the rapid charging battery 12 enables the user to obtain a required electric power within a short time from the power transfer device 11 by rapid charging. For this reason, the user does not need to wait for charging for a long time at a location where the power transfer device 11 is installed. The second power transfer unit 12c may also adopt a non-contact type power transfer system. When the mobile terminal 13 is charged from the rapid charging battery 12, power may be transferred slowly at such a current value that is specified so as not to deteriorate the internal battery 13a of the mobile terminal 13. For example, after the rapid charging battery 12 has been charged from the power transfer device 11, the mobile terminal 13 may be charged from the rapid charging battery 12.

In the charging system 10, the first charging standard is used when the rapid charging battery 12 is charged from the power transfer device 11. The first charging standard specifies that the rapid charging battery 12 is to be charged at a predetermined current value. The predetermined current value for the rapid charging battery 12 is set to, for example, a current value of higher than or equal to 5 C rate of the rapid charging battery 12. The current value at which the rapid charging battery 12 is charged from the power transfer device 11 may be determined based on the current value pre-stored in the first charging unit 12b. In this case, it is possible to set a current value depending on the performance of the rapid charging battery 12 when the rapid charging battery 12 is charged from the power transfer device 11.

As illustrated in FIG. 1, the rapid charging battery 12 includes the first charging unit 12b, which is compatible with the first charging standard specifying that charging is to be performed at a predetermined current value of higher than or equal to 5 C rate, and a second charging unit 13b, which is compatible with the second charging standard specifying that charging is to be performed at a predetermined current value that is lower than the predetermined current value specified by the first charging standard. Herein, the first charging standard is set to permit a current value that is higher than or equal to two times, (for example, higher than or equal to 3 times, higher than or equal to 5 times, or even higher than or equal to 10 times) a maximum current value that is permitted by the second charging standard. The just-described rapid charging battery 12 enables the user to obtain a required electric power within a short time by rapid charging. In contrast, the power transfer from the rapid charging battery 12 is able to accomplish slower power transfer.

The charging system 10 may be configured to communicate usage information between the power transfer device 11 and the rapid charging battery 12 when the rapid charging battery 12 is charged from the power transfer device 11. Such a configuration can be implemented by, for example, a process executed by controllers built into the power transfer device 11 and the rapid charging battery 12. In this case, examples of the usage information may include such information as user information of the rapid charging battery 12, amount of charge of the rapid charging battery 12 charged from the power transfer device 11, charging time, and time of day. For example, in cases where the power transfer device 11 is installed in a retail store such as a convenience store, the user may pay the fee for receiving the service in advance so that the charging service corresponding to the payment amount is provided. In this case, because usage information is communicated between the power transfer device 11 and the rapid charging battery 12, the charging service is provided appropriately in an appropriate amount of charge and appropriate charging time according to the amount of fee that has been pre-paid.

The charging system 10 may execute billing to the user of the rapid charging battery 12 based on such usage information. Here, the billing to the user of the rapid charging battery 12 may be performed, for example, so as to bill a pre-registered user who is registered in advance in association with the identity information pre-assigned to the rapid charging battery 12. The content of the billing may be determined in advance. The billing process may be executed according to a program recorded in advance.

Furthermore, the power transfer device 11 may be provided with a payment function. Such a payment function may use cashless payment, such as various types of digital currencies and credit cards. As described above, it is possible to allow the user to pay the price either before or after the user receives the charging service. In cases where the user pays the fee in advance before receiving the charging service, for example, the amount of the fee corresponding to the amount of charging may be presented on a display provided for the power transfer device 11. The user may select a desired amount of charging, and the charging system 10 may execute a billing process corresponding to the amount of charging. In cases where the user pays the fee later after having received the charging service, for example, the amount of the fee may be presented on a display provided for the power transfer device 11 based on the usage information according to the billing process. For the payment process for the billing process, the system may be configured so that, for example, existing cash payment or existing cashless payment can be applied thereto.

When the power transfer device 11 is provided with such a payment function, the power transfer device 11 can be installed, not just in convenience stores, but at a location where there is no dedicated operator, such as in a railway station yard or at a corner of a retail store such as a supermarket. The power transfer device 11 may not necessarily be a dedicated device, but it may be incorporated in other types of service devices, such as ticket vending machines or other vending machines. If such a power transfer device 11 becomes commonplace at a large number of locations in town, the user may be able to obtain a required electric power for the rapid charging battery 12 at any time and any place the user desires. This allows the user to be able to charge the mobile terminal 13 in town easily and make use of the mobile terminal 13 without worrying about the remaining battery level.

As illustrated in FIG. 1, the charging system 10 may further include a server 31 for providing a charging service to users. Herein, the server 31 is a computer that is used to provide the service offered by this charging system. The server 31 includes a memory storage device and an arithmetic unit. The server 31 stores necessary information in association with client computers, and also provides necessary information. Each of the power transfer device 11, the mobile terminal 13, and the like communicates with the server 31 as appropriate and serves as a client computer for the server 31. In this embodiment, the server 31 includes, as illustrated in FIG. 1, a memory storage unit 31a, a communication unit 31b, and a controller 31c.

The charging system 10 may be constructed of the power transfer device 11 and the rapid charging battery 12. The memory storage unit 31a stores at least one of user information for identifying a user who is eligible to receive the service and an identity information of a rapid charging battery 12 that is eligible to receive the service. Herein, it is possible that the user information may be ID information that is able to identify an individual user. It is possible that the identity information of the rapid charging battery 12 may be information for identifying the rapid charging battery 12. It is possible that the identity information of the rapid charging battery 12 may be information that is given one-to-one to the rapid charging battery 12. The identity information of the rapid charging battery 12 may be assigned in advance at the time of, for example, manufacture or shipment of the rapid charging battery 12.

The communication unit 31b may be communicatively connected to at least one of the power transfer device 11 and the rapid charging battery 12.

In this embodiment, the controller 31c may be configured to execute the following processes a1 to a3.

Process a1: Acquiring a predetermined type of information that is verifiable with the user information and the identity information stored in the memory storage unit 31a from at least one of the power transfer device 11 and the rapid charging battery 12 that are included in the charging system 10.

Process a2: Determining whether or not it is permissible to provide the service based on the predetermined type of information that is acquired in the process a1.

Process a3: Performing charging that is compatible with the first charging standard between the power transfer device 11 and the rapid charging battery 12 if it is determined in the process a2 that it is permissible to provide the service.

In the process a1, the information may be acquired through the power transfer device 11 when the rapid charging battery 12 is not provided with the communication function with the server 31. In this case, the controller 31c of the server 31 may acquire the user information or the identity information of the rapid charging battery 12, for example, from the rapid charging battery 12 through the power transfer device 11. When the rapid charging battery 12 is provided with the communication function with the server 31, the controller 31c may acquire the user information or the identity information of the rapid charging battery 12, for example, directly from the rapid charging battery 12.

In the process a2, for example, the user or the identity of the rapid charging battery 12 may be authenticated based on the information acquired from at least one of the power transfer device 11 and the rapid charging battery 12. The authentication process may be carried out by verifying the information acquired from at least one of the power transfer device 11 and the rapid charging battery 12 against the user information or the identity information stored in the memory storage unit 31a of the server 31. As a result of the verification, if the information acquired from the power transfer device 11 or the rapid charging battery 12 matches the information stored in the server 31, it may be determined that it is permissible to provide the service.

Such a charging system 10 is able to provide a charging service from the power transfer device 11 to the rapid charging battery 12 through user authentication via the server 31. Thus, for example, it is possible to apply a post payment process or the like corresponding to the use of the charging service to the user verified with the user information or the identity information.

Mobile Terminal 13

The mobile terminal 13 includes an internal battery 13a, a second charging unit 13b, a communication unit 13c, and various hardware components and a controller 13d for implementing basic features of the mobile terminal 13. Note that the hardware components and the controller 13d for implementing the basic features of the mobile terminal 13 are represented by dashed line in the mobile terminal 13 shown in FIG. 1. Specific graphical representations and descriptions of the hardware components and the controller 13d for implementing the basic features of the mobile terminal 13 will not be presented herein. No limitation is placed on the configurations and the basic features of the mobile terminal 13 unless specifically stated otherwise. Examples of the mobile terminal 13 include a smartphone, a mobile phone, a tablet terminal, and a mobile personal computer.

Internal Battery 13a

The internal battery 13a is a battery serving as a power supply that supplies electric power to the mobile terminal 13. The internal battery 13a may have a required battery capacity that is required to operate the mobile terminal 13 continuously for a certain time.

Second Charging Unit 13b

The second charging unit 13b is electrically connected to the rapid charging battery 12 and is compatible with the second charging standard. The second charging unit 13b may include a receiving device 13b1, a controller 13b2, and a communication circuit 13b3. The receiving device 13b1 may correspond to the transmission device 12c1 of the second power transfer unit 12c. The receiving device 13b1 may adopt, for example, a device that is capable of receiving electric power at high power. The controller 13b2 may be configured to control the receiving electric power. The communication circuit 13b3 may adopt a communication standard corresponding to the communication circuit 12c3 of the second power transfer unit 12c.

The current value specified by the second charging standard may be set to be less than 5 C rate of the internal battery 13a of the mobile terminal 13 (for example, less than 3 C rate or 1 C rate). The current value specified by the second charging standard can be designated by, for example, C rate, such as 1 C rate or 0.5 C rate of the internal battery 13a. The current value specified by the second charging standard can also be designated by a current value, such as 2 A or 3 A. The current value specified by the second charging standard may be set to a low current value such that the deterioration of the internal battery 13a does not develop. Thus, the current value specified by the second charging standard may be determined corresponding to the charging performance of the internal battery 13a of the mobile terminal 13. More specifically, power transfer from the rapid charging battery 12 to the internal battery 13a does not need to be rapid charging. The second charging standard may be set so that the deterioration of the internal battery 13a can be prevented.

The rapid charging battery 12 and the mobile terminal 13 may be provided separately from each other. The rapid charging battery 12 and the mobile terminal 13 are capable of being accommodated in a pocket of a bag or the like. At least one of the rapid charging battery 12 and mobile terminal 13 may be provided with a retaining part that allows charging of the least one of the rapid charging battery 12 and mobile terminal 13 while being held in a hand. The rapid charging battery 12 may be incorporated in a protective case for the mobile terminal 13. For example, the rapid charging battery 12 may be integrally built into the protective case. Alternatively, the rapid charging battery 12 may be a separate component from the protective case and may be accommodated in an accommodating space provided in the protective case of the mobile terminal 13. In addition, the housing of the rapid charging battery 12 may be provided with a retaining part that retains the mobile terminal 13. When the rapid charging battery 12 is built into the mobile terminal 13 or configured to be carried together with the mobile terminal 13 in this way, the user is freed from the necessity of carrying a portable charger in addition to the mobile terminal 13.

The dash-dot-dot line in FIG. 1 virtually shows the housing of the mobile terminal 13, as a modified example. As indicated by the dash-dot-dot line in FIG. 1, the rapid charging battery 12 may be built into the mobile terminal 13. In other words, the rapid charging battery 12 may be incorporated inside the housing of the mobile terminal 13.

When the rapid charging battery 12 is built into the mobile terminal 13, the second power transfer unit 12c and the second charging unit 13b, which controls charging from the rapid charging battery 12 to the internal battery 13a, may be constructed of a single control unit and mounted inside the housing of the mobile terminal 13.

Figure 2:
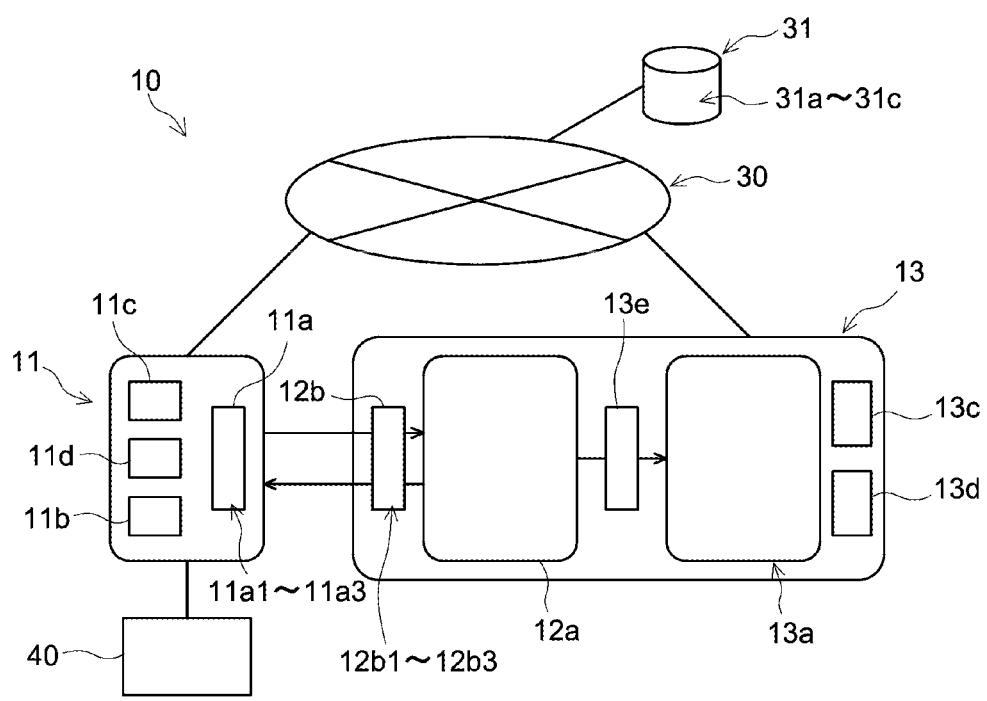
FIG. 2 is a block diagram view schematically illustrating another example of the charging system 10.

FIG. 2 is a block diagram view schematically illustrating another example of the charging system 10. FIG. 2 shows another example of an embodiment in which a rapid charging battery 12 is built into a mobile terminal 13. As illustrated in FIG. 2, the mobile terminal 13 may include a rapid charging battery 12, an internal battery 13a, a first charging unit 12b that is compatible with the first charging standard for charging the rapid charging battery 12, and a second charging unit 13e that is compatible with the second charging standard specifying that charging is to be performed at a predetermined current value that is lower than the predetermined current value specified by the first charging standard, for charging the internal battery 13a from the rapid charging battery 12. In this case, because the rapid charging battery 12 is built into the mobile terminal 13, the circuit for charging the internal battery 13a from the rapid charging battery 12 may be a wired circuit. Adopting a wired circuit serves to reduce the energy loss in charging the internal battery 13a from the rapid charging battery 12.

Such a charging system 10 may be configured to execute a first charging process and a second charging process.

The first charging process is a process of charging the rapid charging battery 12 from the power transfer device 11 at a current value specified by the first charging standard.

The second charging process is a process of, subsequent to the first charging process, charging the internal battery 13a from the rapid charging battery 12 at a current value specified by the second charging standard.

Herein, the first charging standard may be established so that rapid charging can be achieved between the power transfer device 11 and the rapid charging battery 12. The second charging standard may be established so that the charging from the rapid charging battery 12 to the internal battery 13a can be achieved at an appropriate current value such as to prevent the deterioration of the internal battery 13a. Thus, the charging standard between the power transfer device 11 and the rapid charging battery 12 and the charging standard between the rapid charging battery 12 and the internal battery 13a are provided separately. Therefore, rapid charging for the rapid charging battery 12 and slow charging for the internal battery 13a are achieved. Moreover, by performing the second charging process after the first charging process, charging of the rapid charging battery 12 can be accomplished in a short time.

The first charging unit 12b may pre-store a predetermined current value that is higher than or equal to 5 C rate of the mounted rapid charging battery 12. The current value at which the rapid charging battery 12 is charged from the power transfer device 11 in the first charging process may be determined based on the current value pre-stored in the first charging unit 12b. In this case, for example, even when the power transfer device 11 is used by a large number of unspecified rapid charging batteries 12 of unknown model types, it is possible to control the current value at which the rapid charging batteries 12 are charged from the power transfer device 11 to be an appropriate current value for the rapid charging batteries 12. As a result, even when the power transfer device 11 is used by a large number of unspecified rapid charging batteries 12, the deterioration of the rapid charging batteries 12 is minimized.

The second charging unit 13b may pre-store a predetermined current value that is less than 5 C rate of the internal battery 13a. In this case, the current value at which the internal battery 13a is charged from the rapid charging battery 12 in the second charging process may be determined based on the current value that is pre-stored in the second charging unit 13b. With this configuration, for example, when a large number of unspecified mobile terminals 13 of unknown model types are charged from the rapid charging battery 12, the current value at which the mobile terminals 13 are charged from the rapid charging battery 12 is controlled to be an appropriate current value for each of the internal batteries 13a of the mobile terminals 13. As a result, even when the a large number of unspecified mobile terminals 13 are charged from the rapid charging battery 12, the deterioration of the internal batteries 13a of the mobile terminals 13 is minimized.

In the charging system 10, usage information may be communicated between the power transfer device 11 and the mobile terminal 13 when the first charging process is executed. In other words, when the rapid charging battery 12 is charged from the power transfer device 11, information related to the user of the charging system 10 (i.e., usage information) may be exchanged between the power transfer device 11 and the rapid charging battery 12. Such a process can be implemented by, for example, controllers incorporated in the power transfer device 11 and the mobile terminal 13. Herein, although not described specifically, examples of the usage information may include user information, amount of charging, charging time (such as start time of the charging and end time of the charging), identity information of the power transfer device 11, identity information of the rapid charging battery 12, and identity information of the mobile terminal 13. Because such usage information is communicated between the power transfer device 11 and the mobile terminal 13, the content of the first charging process can be managed appropriately.

The charging system 10 may be configured to execute a process of billing to a user of the mobile terminal 13 based on the usage information. The billing process and the payment process may be performed, for example, through software that is pre-registered in the mobile terminal 13, concerning the use of the charging system 10.

As illustrated in FIGS. 1 and 2, the charging system 10 may further include the server 31. When the charging system 10 is constructed to include the mobile terminal 13, the server 31 may be configured to operate appropriately in association with the mobile terminal 13. For example, the memory storage unit 31a of the server 31 may store the information of the mobile terminal 13 that is eligible to receive the service. The communication unit 31b of the server 31 may be configured to be communicatively connected to the mobile terminal 13.

The controller 31c of the server 31 may be configured to execute the following processes b1 to b3.

Process b1: Acquiring predetermined information that is verifiable with the user information and the identity information stored in the memory storage unit 31a from at least one of the power transfer device 11, the rapid charging battery 12, and the mobile terminal 13 that are included in the charging system 10.

Process b2: Determining whether or not it is permissible to provide the service based on the predetermined type of information that is acquired in the process b1.

Process b3: Performing charging that is compatible with the first charging standard between the rapid charging battery and the power transfer device if it is determined in the process b2 that it is permissible to provide the service.

In the process b1, the information may be acquired through the power transfer device 11 or the mobile terminal 13 when the rapid charging battery 12 is not provided with the communication function with the server 31. In this case, the controller 31c of the server 31 may acquire the user information or the identity information of the rapid charging battery 12, for example, from the rapid charging battery 12 through the power transfer device 11 or the mobile terminal 13. It is also possible that the server 31 may communicate with the power transfer device 11 or the mobile terminal 13 to acquire the user information or the device identity information.

In the process b2, for example, at least one of the user, the identity of the rapid charging battery 12, or the identity of the mobile terminal 13 may be authenticated based on the information acquired from at least one of the power transfer device 11, the rapid charging battery 12, and the mobile terminal 13. The authentication process may be carried out by verifying the information acquired from at least one of the power transfer device 11, the rapid charging battery 12, and the mobile terminal 13 against the user information or the identity information stored in the memory storage unit 31a of the server 31. As a result of the verification, if the information acquired from the power transfer device 11, the rapid charging battery 12, or the mobile terminal 13 matches the information stored in the server 31, it may be determined that it is permissible to provide the service.

Such a charging system 10 is able to provide charging from the power transfer device 11 to the rapid charging battery 12 through user authentication. Thus, for example, it is possible to apply a post payment process or the like corresponding to the use of the charging service to the user verified with the user information or the identity information. In addition, for a pre-registered user, the charging service may be provided on a monthly flat rate basis, for example, not on a pay-as-you-go basis.

The server 31 may be configured to communicate usage information with at least one of the power transfer device 11 and the mobile terminal 13 when the first charging process is executed. The server 31 may be configured to execute a process of billing to a user of the mobile terminal 13 based on the usage information. The server 31 may be configured to execute a process of billing to a user of the rapid charging battery 12 based on the usage information.

Various embodiments of the charging system have been described hereinabove according the present disclosure. Unless specifically stated otherwise, the embodiments of the charging system described herein do not limit the scope of the present invention. It should be noted that various other modifications and alterations may be possible in the embodiments of the charging system disclosed herein. In addition, the features, structures, or steps described herein may be omitted as appropriate, or may be combined in any suitable combinations, unless specifically stated otherwise.

What is claimed is:

1. A charging system comprising:
   a power transfer device;
   a rapid charging battery; and
   a server for providing a charging service to users, wherein:
   the power transfer device includes a first power transfer unit being compatible with a first charging standard specifying that the rapid charging battery is to be charged at a predetermined current value;

the rapid charging battery includes:
  a first charging unit being compatible with the first charging standard; and
  a second power transfer unit being compatible with a second charging standard specifying that power is to be transferred at a predetermined current value that is lower than the predetermined current value specified by the first charging standard; and
the server comprises:
  a memory storage unit storing at least one of user information for identifying a user who is eligible to receive the charging service and an identity information of a rapid charging battery that is eligible to receive the charging service;
  a communication unit communicatively connected to at least one of the power transfer device and the rapid charging battery; and
  a controller, and
the controller is configured to execute:
  a process a1 of acquiring predetermined information that is verifiable with the user information and the identity information stored in the memory storage unit from at least one of the power transfer device and the rapid charging battery that are included in the charging system;
  a process a2 of determining whether or not it is permissible to provide the charging service based on the predetermined information that is acquired in the process a1; and
  a process a3 of charging the rapid charging battery with the power transfer device according to the first charging standard if it is determined in the process a2 that it is permissible to provide the charging service.

2. The charging system according to claim 1, wherein the current value specified by the first charging standard is higher than or equal to 5 C rate of the rapid charging battery.

3. The charging system according to claim 1, wherein:
  the first charging unit pre-stores a predetermined current value corresponding to charging performance of the rapid charging battery; and
  a current value at which the rapid charging battery is charged from the power transfer device is determined based on the current value that is stored in the first charging unit.

4. The charging system according to claim 1, configured to execute a process of communicating usage information between the power transfer device and the rapid charging battery when the rapid charging battery is charged from the power transfer device.

5. The charging system according to claim 4, configured to execute billing to a user of the rapid charging battery based on the usage information.

6. The charging system according to claim 1, further comprising:
  a mobile terminal,
  the mobile terminal including:
    an internal battery supplying electric power to the mobile terminal; and
    a second charging unit electrically connected to the rapid charging battery and being compatible with the second charging standard.

7. The charging system according to claim 6, wherein the rapid charging battery is incorporated in a protective case for the mobile terminal.

8. The charging system according to claim 7, wherein:
  the second charging unit stores a predetermined current value corresponding to charging performance of the internal battery; and
  a current value at which the internal battery is charged from the rapid charging battery is determined based on the current value that is stored in the second charging unit.

9. The charging system according to claim 6, wherein the rapid charging battery is built into the mobile terminal.

10. The charging system according to claim 6, configured to execute:
  a first charging process of charging the rapid charging battery from the power transfer device at a current value specified by the first charging standard; and
  a second charging process of, subsequent to the first charging process, charging the internal battery from the rapid charging battery at a current value specified by the second charging standard.

11. The charging system according to claim 6, configured to execute a process of communicating usage information between the power transfer device and the mobile terminal when the first charging process is executed.

12. The charging system according to claim 11, configured to execute a process of billing to a user of the mobile terminal based on the usage information.

13. The charging system according to claim 6, wherein the server further comprises:
  a memory storage unit storing at least one of user information for identifying a user who is eligible to receive a service and an identity information of a mobile terminal or a rapid charging battery that is eligible to receive the service;
  a communication unit communicatively connected to at least one of the power transfer device, the rapid charging battery, and the mobile terminal; and
  a controller; and
the controller is configured to execute:
  a process b1 of acquiring predetermined information that is verifiable with the user information and the identity information stored in the memory storage unit from at least one of the power transfer device, the rapid charging battery, and the mobile terminal that are included in the charging system;
  a process b2 of determining whether or not it is permissible to provide the service based on the predetermined information that is acquired in the process b1; and
  a process b3 of charging the rapid charging battery with the power transfer device according to the first charging standard if it is determined in the process b2 that it is permissible to provide the service.

14. The charging system according to claim 13, wherein the server is configured to communicate usage information with at least one of the power transfer device and the mobile terminal when the first charging process is executed.

15. The charging system according to claim 14, wherein the server is configured to execute a process of billing to a user of the mobile terminal based on the usage information.

16. The charging system according to claim 14, configured to execute a process of billing to a user of the rapid charging battery based on the usage information.

17. A charging system comprising:
a power transfer device;
a mobile terminal; and
a server for providing a charging service to users, wherein:
the power transfer device includes a first power transfer unit being compatible with a first charging standard specifying that a rapid charging battery is to be charged at a predetermined current value;
the mobile terminal includes:
  a rapid charging battery;
  an internal battery supplying electric power to the mobile terminal;
  a first charging unit being compatible with the first charging standard and configured to charge the rapid charging battery; and
  a second charging unit being compatible with a second charging standard specifying that charging is to be performed at a predetermined current value that is lower than the predetermined current value specified by the first charging standard, the second charging unit charging the internal battery from the rapid charging battery; and
the server comprises:
  a memory storage unit storing at least one of user information for identifying a user who is eligible to receive the charging service and an identity information of a rapid charging battery that is eligible to receive the charging service;
  a communication unit communicatively connected to at least one of the power transfer device and the rapid charging battery; and
  a controller, and
the controller is configured to execute:
  a process a1 of acquiring predetermined information that is verifiable with the user information and the identity information stored in the memory storage unit from at least one of the power transfer device and the rapid charging battery that are included in the charging system;
  a process a2 of determining whether or not it is permissible to provide the charging service based on the predetermined information that is acquired in the process a1; and
  a process a3 of charging the rapid charging battery with the power transfer device according to the first charging standard if it is determined in the process a2 that it is permissible to provide the charging service.

18. A charging system comprising:
a rapid charging battery;
a server for providing a charging service to users;
a first charging unit being compatible with a first charging standard specifying that the battery is to be charged at a predetermined current value of higher than or equal to 5 C rate; and
a second power transfer unit being compatible with a second charging standard specifying that power is to be transferred at a predetermined current value that is lower than the predetermined current value specified by the first charging standard, wherein
the first charging standard is set to permit a current value that is higher than or equal to two times a maximum current value that is permitted by the second charging standard, and
the server comprises:
  a memory storage unit storing at least one of user information for identifying a user who is eligible to receive the charging service and an identity information of a rapid charging battery that is eligible to receive the charging service;
  a communication unit communicatively connected to the rapid charging battery; and
  a controller, and
the controller is configured to execute:
  a process a1 of acquiring predetermined information that is verifiable with the user information and the identity information stored in the memory storage unit from the rapid charging battery that are included in the charging system;
  a process a2 of determining whether or not it is permissible to provide the charging service based on the predetermined information that is acquired in the process a1; and
  a process a3 of charging the rapid charging battery according to the first charging standard if it is determined in the process a2 that it is permissible to provide the charging service.

19. The charging system according to claim 18, wherein the first charging unit pre-stores a current value corresponding to charging performance of the rapid charging battery.

* * * * *